United States Patent Office.

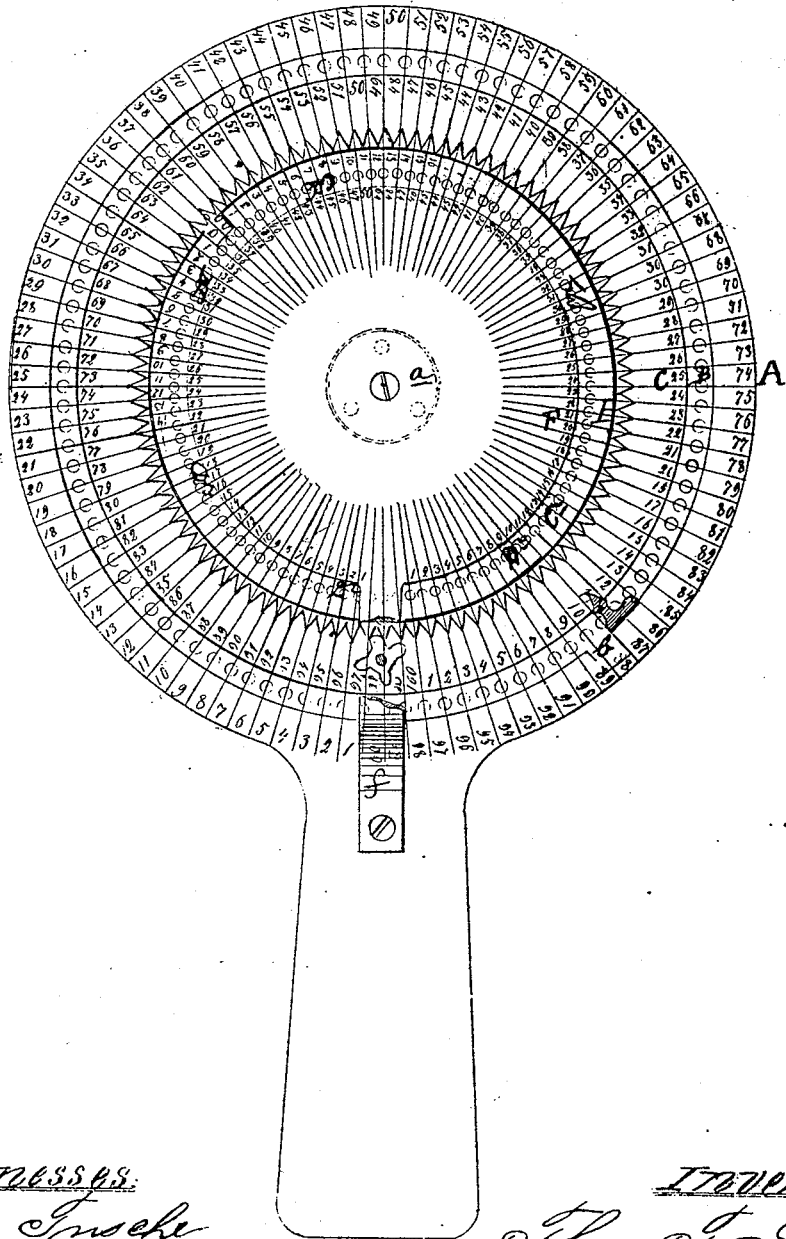

THOMAS T. STRODE, OF MORTONVILLE, PENNSYLVANIA.

Letters Patent No. 74,170, dated February 4, 1868.

---

CALCULATING AND REGISTERING-MACHINE.

---

The Schedule referred to in these Letters Patent and making part of the same.

---

TO ALL WHOM IT MAY CONCERN:

Be it known that I, THOMAS T. STRODE, of Mortonville, in the county of Chester, and State of Pennsylvania, have invented a new and improved Calculating and Registering-Machine; and I do hereby declare that the following is a full, clear, and exact description thereof, which will enable others skilled in the art to make and use the same, reference being had to the accompanying drawings, forming part of this specification.

This invention relates to an improved calculating and registering-machine, being a simplification of the calculating-machines heretofore invented; and consists in a series of disks and indicator-wheels, a spur upon one wheel meshing into a pinion, which meshes into a cog-wheel, and carries the latter round the space of one cog for a completed revolution of the first wheel; the result of the addition or subtraction being read off for hundreds or dollars through a slot in a disk superposed on the fourth disk, the units or cents being read off the first or third disk opposite the indicator attached or marked upon the second disk. By increasing the number of disks the calculation and registration may be carried up to any desired number or amount.

The accompanying drawing represents a top view of my improved calculating-machine arranged for calculating a debtor and creditor account.

A is an outer disk, which may be made of wood or metal, and may be furnished with a handle, X, and having numbers, from 1 to 100, arranged round the edge of the upper surface, from left to right. On this a smaller disk, B, is superposed, having one hundred holes corresponding with the hundred numbers of the outer disk, and free to revolve upon an axis, a. The disk B carries an extension-indicator, b, and a spur, b'. A fixed disk, C, smaller than the disk B, and numbered from 1 to 100 from right to left, is superposed on disk B; and a toothed disk, D, having one hundred teeth, numbered from 00 to 50 from left to right, and from 0 to 48 from right to left, free to move on the axis a, is superposed on disk C. Upon this is superposed another plate, E, also free to move upon the axis a', and having one hundred pin-holes uniformly arranged around it. A fixed disk, F, numbered from 1 to 50 from right to left, and from 1 to 47 from left to right, No. 47 being next to No. 50 counting from left to right, is superposed on the disk E, the disk F having a shank, f, secured to the handle of the disk A. In the shank f the axis of the pinion G, which meshes in the toothed wheel D, has its bearing. As the disk B is carried round from left to right, the spur b' strikes against the pinion G, causing it to take a quarter revolution, and revolving the disk D the distance of one tooth or the one-hundredth of a revolution in the opposite direction.

When the instrument is intended to be used for the purpose of keeping a debtor and creditor account, the two divisions of the plate or disk E to the right and left of the centre of the slot should be marked respectively debtor and creditor, and will be used in the following manner:

First, to ascertain the debtor side, take a pin, of hard wood or of other suitable material, and insert it in the hole in disk B opposite the number (say of cents) in disk C which it is required to add, and turn from left to right till stopped by the shank f. Continue this process till all the required units and tens (say cents) are added, when the sum (exclusive of hundreds, or, say, dollars,) will be read off the disk A, shown therein by the indicator b of disk B, which I call the cent-disk. If the total exceeded one hundred, as the bent indicator or spur b' passed under the shank f, the pinion G would drive the toothed disk D one tooth from right to left, bringing under the slot a number increased by one if the amount previously indicated was a debtor amount, or diminished by one if the amount previously indicated happened to have been a creditor amount.

To add the dollars, now insert the pin in disk E, which I call the dollar-disk, in the hole therein opposite the number from 1 to 50 on the right side of F wheel, and turn from left to right till stopped by the shank f, and continue the process till all the dollars are added up to 50, beyond which the machine, as shown in the drawing, will not register. The amount of dollars on the debt side will then be read off through the slot in disk E.

By adding to the machine an additional toothed and slotted disk, worked by a pinion-arrangement similar to that by which the disk D is operated, the toothed disk having two hundred numbers, from 00 to 99 from left to right, and from 0 to 98 from right to left, will enable $49,000 and 99 cents, or $4,900,099, disregarding cents, to be calculated and registered either on the debtor or creditor side, and so forth, ad infinitum.

The credit side of the account will be registered by placing the pin or peg in the hole in the cent-disk, B opposite the number on disk A corresponding to the number of cents to be added in turn from right to left, till stopped by shank $f$, and continuing the process till all cents on the credit side are added, then credit the dollars, by inserting pin in dollar-disk opposite the number on the left-hand side of the disk F, and turn from right to left till stopped by shank $f$, and continue the process till all the required dollars are credited. The balance of debtor or of the credits deducted from debits only will be shown till the debits are liquidated, and such balance will be read off disk A, shown by indicator $b$, until the balance is on the credit side, when the credit cents will be read off the disk C by the ring on disk B above the spur $b'$.

It will be observed that the spur occupies two spaces, to compensate for the 0 and 00 on disk D. The supplement of any number to 100, or change for a dollar, is shown by presenting the ring or indicator $b$ to the number on the disk C or A, when the supplement or change will be read off the disk A or C respectively, being shown by the indicator $b$ or ring respectively.

Whether the instrument indicates a debtor or creditor side is shown by the position of the cog having 0 on its face on disk D with respect to disk E. If the cog having 0 on its face be on the debit side of disk E, the balance shown is debit; if on the credit side, the amount shown is a credit amount. When 0 is in the slot, then the amount is credit, and if 100 be marked by the indicator-ring, it means $1 credit; and so, whenever the amount shown is a credit, and 100 is shown by the indicator-ring, one whole dollar is to be added to the dollars shown. All independent additions or subtractions should be made with the debit side, as, on 99 being reached, the cog-wheel is moved the distance of one cog, and shows the century completed and the next century commenced.

The capacity of the instrument may be increased by placing two circles of figures on cog-wheel D and top disk F, numbered in opposite directions from 1 to 99.

To empty the cent-wheel, insert pin in hole between extension-indicator and spur, and turn from right to left till pin strikes shank $f$. To empty dollar-wheel, turn in either direction till 00 appears in slot.

What I claim as new, and desire to secure by Letters Patent, is—

1. The combination of disks A, B, C, D, E, and F, or their respective equivalents, numbered and arranged as herein specified, or in any equivalent manner, all substantially as herein set forth and described.

2. The spur $b'$, in combination with the pinion G and toothed disk D, or their respective equivalents, substantially as shown and described.

THOMAS T. STRODE.

Witnesses:
H. G. THOMAS,
S. E. THOMAS.